(12) United States Patent
Crawford et al.

(10) Patent No.: US 10,373,508 B2
(45) Date of Patent: Aug. 6, 2019

(54) DEVICES, SYSTEMS, AND METHODS FOR ENRICHING COMMUNICATIONS

(75) Inventors: Richard P. Crawford, Davis, CA (US); Margaret E. Morris, Portland, OR (US); Muki Hasteen-Izora, Portland, OR (US); Nancy Vuckovic, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 342 days.

(21) Appl. No.: 13/534,317

(22) Filed: Jun. 27, 2012

(65) Prior Publication Data

US 2014/0004486 A1 Jan. 2, 2014

(51) Int. Cl.
| | |
|---|---|
| G09B 19/04 | (2006.01) |
| G06F 17/27 | (2006.01) |
| G09B 5/00 | (2006.01) |
| G09B 5/06 | (2006.01) |

(52) U.S. Cl.
CPC ........... *G09B 5/00* (2013.01); *G06F 17/2735* (2013.01); *G09B 5/06* (2013.01)

(58) Field of Classification Search
CPC ...................................................... G09B 5/00
USPC ............................................................ 704/10
See application file for complete search history.

(56) References Cited

U.S. PATENT DOCUMENTS

| | | | | |
|---|---|---|---|---|
| 5,597,312 A | * | 1/1997 | Bloom | G09B 7/04 434/118 |
| 6,199,043 B1 | * | 3/2001 | Happ | G10L 15/22 704/260 |
| 6,236,968 B1 | * | 5/2001 | Kanevsky | G08B 21/06 704/270 |
| 6,721,704 B1 | * | 4/2004 | Strubbe et al. | 704/270 |
| 6,754,665 B1 | * | 6/2004 | Futagami | G06F 21/6245 |
| 6,795,808 B1 | * | 9/2004 | Strubbe | G06F 17/30702 704/270 |

(Continued)

FOREIGN PATENT DOCUMENTS

| | | | | |
|---|---|---|---|---|
| CN | 102362471 A | | 2/2012 | |
| GB | 2405553 A | * | 3/2005 | ............. H04M 3/51 |

(Continued)

OTHER PUBLICATIONS

Margaret Morris et al. "New Perspectives on Ubiquitous Computing from Ethnographic Study of Elders with Cognitive Decline," Springer-Verlag, pp. 227-242, 2003.

(Continued)

*Primary Examiner* — Daniel C Washburn
*Assistant Examiner* — Oluwadamilona M Ogunbiyi
(74) *Attorney, Agent, or Firm* — Barnes & Thornburg LLP

(57) ABSTRACT

Devices, systems, and methods for enriching communications may include communications circuitry configured to process one or more verbal communications signals being transmitted between a computing device and a remote computing device, the one or more verbal communications signals relating to a conversation between a user of the computing device and a user of the remote computing device, a conversation dynamics engine configured to generate at least one suggested conversation topic by analyzing the one or more verbal communications signals, and a display configured to present the at least one suggested conversation topic to the user of the computing device.

30 Claims, 3 Drawing Sheets

(56) References Cited

U.S. PATENT DOCUMENTS

| | | | |
|---|---|---|---|
| 7,676,026 B1 * | 3/2010 | Baxter, Jr. | 379/88.01 |
| 7,831,426 B2 * | 11/2010 | Bennett | 704/252 |
| 8,407,049 B2 * | 3/2013 | Cromack et al. | 704/235 |
| 8,423,363 B2 * | 4/2013 | Gupta et al. | 704/255 |
| 8,433,611 B2 * | 4/2013 | Lax et al. | 705/14.4 |
| 8,620,658 B2 * | 12/2013 | Nakade et al. | 704/257 |
| 8,838,505 B2 * | 9/2014 | Jang | G06Q 10/06311 704/246 |
| 2001/0021909 A1 * | 9/2001 | Shimomura | G10L 15/22 704/275 |
| 2005/0171783 A1 | 8/2005 | Suominen | |
| 2005/0283475 A1 * | 12/2005 | Beranek et al. | 707/6 |
| 2006/0041378 A1 * | 2/2006 | Cheng | G01C 21/3641 701/431 |
| 2006/0047362 A1 * | 3/2006 | Aoyama | G10L 15/22 700/245 |
| 2006/0259473 A1 | 11/2006 | Li et al. | |
| 2007/0051793 A1 * | 3/2007 | Katoh | G06F 17/30265 235/375 |
| 2008/0014569 A1 * | 1/2008 | Holiday | G09B 3/00 434/351 |
| 2008/0115080 A1 * | 5/2008 | Matulic | G06F 17/30253 715/778 |
| 2008/0235018 A1 * | 9/2008 | Eggen et al. | 704/251 |
| 2009/0094029 A1 * | 4/2009 | Koch et al. | 704/246 |
| 2009/0319917 A1 * | 12/2009 | Fuchs | G06Q 10/107 715/753 |
| 2010/0185437 A1 * | 7/2010 | Visel | G06F 17/271 704/9 |
| 2010/0241991 A1 * | 9/2010 | Bickmore | 715/810 |
| 2010/0246784 A1 | 9/2010 | Frazier et al. | |
| 2011/0112835 A1 | 5/2011 | Shinnishi et al. | |
| 2011/0125498 A1 * | 5/2011 | Pickering | G10L 15/22 704/246 |
| 2011/0282874 A1 * | 11/2011 | Xu et al. | 707/737 |
| 2012/0011454 A1 * | 1/2012 | Droz et al. | 715/758 |
| 2012/0253825 A1 * | 10/2012 | Di Fabbrizio | G06F 17/271 704/275 |
| 2013/0007137 A1 * | 1/2013 | Azzam | H04L 51/16 709/206 |
| 2013/0018718 A1 * | 1/2013 | Cumming | G06Q 30/0269 705/14.41 |
| 2013/0287187 A1 * | 10/2013 | Gandhe | G06F 17/2745 379/93.17 |

FOREIGN PATENT DOCUMENTS

| | | | | |
|---|---|---|---|---|
| JP | 2004096502 A | 3/2004 | | |
| JP | 2011100355 A | 5/2011 | | |
| KR | 1020080006578 A | 1/2008 | | |
| KR | 1020120035100 A | 4/2012 | | |
| WO | WO 9931653 A1 * | 6/1999 | | G10L 5/00 |
| WO | 2006/110495 A | 10/2006 | | |
| WO | 2014004048 A1 | 1/2014 | | |

OTHER PUBLICATIONS

Margaret Morris et al. "Fostering Social Engagement and Self-Efficacy in Later Life: Studies with Ubiquitous Computing," Springer-Verlag, pp. 335-349, 2009.

Eric Dishman, "Inventing Wellness Systems for Aging in Place," IEEE Computer Society, pp. 34-41, May, 2004.

"MyLifeBits," Microsoft Research, Retrieved on Oct. 24, 2012 from http://research.microsoft.com/en-us/projects/mylifebits/default.aspx.

Margaret Morris et al. "Ubiquitous Computing for Cognitive Decline: Findings from Intel's Proactive Health Research," Intel Corporation, pp. 1-11, 2003.

Margaret Morris et al. "Catalyzing Social Interaction with Ubiquitous Computing: A needs assessment of elders coping with cognitive decline," Late Breaking Results Paper, 4 pages, Apr. 24-29, 2004.

"MyLifeBits," Wikipedia, Retrieved on Oct. 24, 2012 from http://en.wikipedia.org/w/index.php?title=MyLifeBits&printable=yes.

Michael Chandler, "Caller ID 6.0," The New York Times, 2 pages, Dec. 12, 2004.

International Search Report and Written Opinion received for International Patent Application No. PCT/US2013/044784, dated Sep. 23, 2013, 13 pages.

Office Action for Chinese Patent Application No. 201380027683.3, dated Dec. 12, 2016, 12 pages.

Second Office Action in Chinese Patent Application No. 201380027683.3, dated Aug. 8, 2017 (10 pages).

Office Action in European Patent Application No. 13810717.2-1958, dated Apr. 5, 2017 (9 pages).

Anonymous: "Skype—Wikipedia, the free encyclopedia," Jun. 6, 2012, retrieved from https://en.wikipedia.org/w/index.php?title=Skype&oldid=496253730 on Sep. 14, 2017.

Anonymous: "Speech Analytics—Wikipedia, the free encyclopedia," Jun. 4, 2012, retrieved from https://en.wikipedia.org/w/index.php?title=Speech_analytics&oldid=496003914 on Sep. 14, 2017.

Anonymous: "Gesture Recognition—Wikipedia, the free encyclopedia," Jun. 18, 2012, retrieved from https://en.wikipedia.org/w/index.php?title=Gesture_recognition&oldid=498176022 on Sep. 14, 2017.

* cited by examiner

DEVICES, SYSTEMS, AND METHODS FOR ENRICHING COMMUNICATIONS

BACKGROUND

The generation of conversation topics may present a challenge to any individual engaged in communication. Conversation topics may be hard to generate because of an ignorance of topical relevance to the other communicants or because of a lack of creativity for or recall of interesting conversation topics. By way of example, individuals evidencing cognitive, memory, visual, and/or hearing problems may have particular difficulty engaging in telephone and/or videoconference communications. Devices, systems, and methods directed to assisting individuals in generating relevant conversation topics may improve their ability to communicate with others effectively.

BRIEF DESCRIPTION

The concepts described in the present disclosure are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

Figure 1:
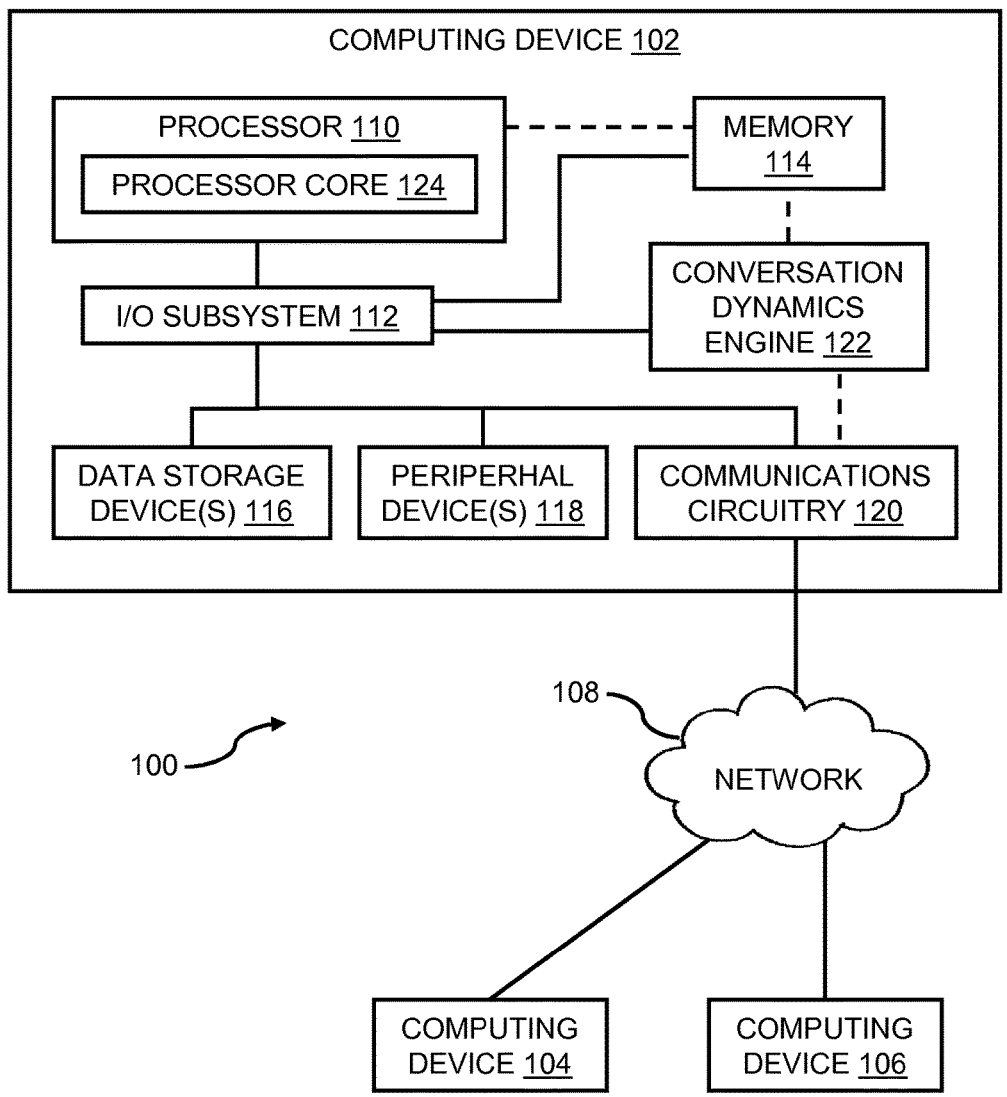
FIG. 1 is a simplified block diagram of at least one embodiment of a system for enriching communications including at least one computing device having a conversation dynamics engine.

While the concepts of the present disclosure are susceptible to various modifications and alternative forms, specific embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present disclosure. It will be appreciated by one skilled in the art, however, that embodiments of the disclosure may be practiced without such specific details. In other instances, control structures, gate level circuits, and full software instruction sequences have not been shown in detail in order not to obscure the description of the of the concepts described herein. Those of ordinary skill in the art, with the included descriptions, will be able to implement appropriate functionality without undue experimentation.

References in the specification to "one embodiment," "an embodiment," "an example embodiment," etcetera, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the concepts described herein may be implemented in hardware, firmware, software, or any combination thereof. Embodiments implemented in a computing device may include one or more point-to-point or bus-based interconnects between components. Embodiments of the concepts described herein may also be implemented as instructions carried by or stored on one or more machine-readable or computer-readable storage media, which may be read and executed by one or more processors. A machine-readable or computer-readable storage medium may be embodied as any device, mechanism, or physical structure for storing or transmitting information in a form readable by a machine (e.g., a computing device). For example, a machine-readable or computer-readable storage medium may be embodied as read only memory (ROM) device(s); random access memory (RAM) device(s); magnetic disk storage media; optical storage media; flash memory devices; mini- or micro-SD cards, memory sticks, and others.

In the drawings, specific arrangements or orderings of schematic elements, such as those representing devices, modules, instruction blocks and data elements, may be shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

In general, schematic elements used to represent instruction blocks may be implemented using any suitable form of machine-readable instruction, such as software or firmware applications, programs, functions, modules, routines, processes, procedures, plug-ins, applets, widgets, code fragments and/or others, and that each such instruction may be implemented using any suitable programming language, library, application programming interface (API), and/or other software development tools. For example, some embodiments may be implemented using Java, C++, and/or other programming languages. Similarly, schematic elements used to represent data or information may be implemented using any suitable electronic arrangement or structure, such as a register, data store, table, record, array, index, hash, map, tree, list, graph, file (of any file type), folder, directory, database, and/or others.

Further, in the drawings, where connecting elements, such as solid or dashed lines or arrows, are used to illustrate a connection, relationship or association between or among two or more other schematic elements, the absence of any such connecting elements is not meant to imply that no connection, relationship or association can exist. In other words, some connections, relationships or associations between elements may not be shown in the drawings so as not to obscure the disclosure. In addition, for ease of illustration, a single connecting element may be used to represent multiple connections, relationships or associations between elements. For example, where a connecting element represents a communication of signals, data or instructions, it should be understood by those skilled in the art that such element may represent one or multiple signal paths (e.g., a bus), as may be needed, to effect the communication.

The present disclosure relates to devices, systems, and methods for enriching communications that analyze verbal and/or video communications signals using a conversation dynamics engine to generate suggested conversation topics and that display the suggested conversation topics to users to facilitate communications. The presently disclosed devices, systems, and methods for enriching communications may also display media elements (e.g., photos, videos, audio, literature, etc.) to users, receive user feedback for refinement of the suggested conversation topics, and create a conversation montage of the communications. Unlike current tools (e.g., audio or video recordings of a conversation) that only provide a user with post-conversation feedback on the communications, the presently disclosed devices, systems, and methods may provide a user with real-time feedback and improve the quality of communication during a telephone and/or videoconference call.

Referring now to FIG. 1, one illustrative embodiment of a system 100 for enriching communications includes a computing device 102, a computing device 104, and a computing device 106. Although three computing devices 102, 104, 106 are illustratively shown in FIG. 1, it is contemplated that the system 100 may include any number of computing devices. In some embodiments, the computing devices 102, 104, 106 may be remote from one another (e.g., located in different rooms, buildings, cities, states, or countries). The computing devices 102, 104, 106 are communicatively coupled to each other over a network 108. As will be further discussed below, the network 108 carries verbal and/or video communications signals that are transmitted between the computing devices 102, 104, 106. The network 108 may be embodied as any type of wired and/or wireless network such as a local area network, a wide area network, a publicly available global network (e.g., the Internet), or other network. The network 108 may include any number of additional devices to facilitate the transmission of communications signals between the computing devices 102, 104, and 106, such as routers, switches, intervening computers, and the like.

The computing device 102 may be embodied as any type of electronic device capable of performing the functions described herein. By way of example, the computing device 102 may be embodied as a personal computer, a workstation, a laptop computer, a handheld computer, a mobile internet device, a cellular phone, a personal data assistant, a telephony device, a network appliance, a virtualization device, a storage controller, an embedded system (e.g., in a vehicle), or other computer-based device. In the illustrative embodiment shown in FIG. 1, the computing device 102 includes a processor 110, an I/O subsystem 112, a system memory 114, one or more data storage devices 116, one or more peripheral devices 118, communications circuitry 120, and a conversation dynamics engine 122. It will be appreciated that, in some embodiments, the computing device 102 may not include all of the foregoing components. Furthermore, it should be appreciated that the computing device 102 may include other components, sub-components, and devices commonly found in a computer and/or computing device, which are not illustrated in FIG. 1 for clarity of the description.

The processor 110 of the computing device 102 may be any type of processor capable of executing software/firmware, such as a microprocessor, digital signal processor, microcontroller, or the like. The processor 110 functions as a primary processor (or central processing unit) of the computing device 102 and is generally responsible for executing a software stack, which may include an operating system and various applications, programs, libraries, and drivers resident on the computing device 102. As shown in FIG. 1, the processor 110 is illustratively embodied as a single core processor having a processor core 124. However, in other embodiments, the processor 110 may be embodied as a multi-core processor having multiple processor cores 124. Furthermore, the computing device 102 may include additional processors 110 having one or more processor cores 124.

The processor 110 is communicatively coupled to the I/O subsystem 112 via a number of signal paths. These signal paths (and other signal paths illustrated in FIG. 1) may be embodied as any type of signal paths capable of facilitating communication between the components of the computing device 102. For example, the signal paths may be embodied as any number of wires, cables, light guides, printed circuit board traces, via, bus, intervening devices, and/or the like. The I/O subsystem 112 of the computing device 102 may be embodied as circuitry and/or components to facilitate input/output operations with the processor 110 and/or other components of the computing device 102. In some embodiments, the I/O subsystem 112 may be embodied as a memory controller hub (MCH or "northbridge"), an input/output controller hub (ICH or "southbridge"), and a firmware device. In other embodiments, I/O subsystems having other configurations may be used. For example, in some embodiments, the I/O subsystem 112 may be embodied as a platform controller hub (PCH). In such embodiments, the memory controller hub (MCH) may be incorporated in or otherwise associated with the processor 110, and the processor 110 may communicate directly with the system memory 114 (as shown by the hashed line in FIG. 1). In still other embodiments, the I/O subsystem 112 may form a portion of a system-on-a-chip (SoC) and be incorporated, along with the processor 110 and other components of the computing device 102, on a single integrated circuit chip.

The system memory 114 of the computing device 102 is also communicatively coupled to the I/O subsystem 112 via a number of signal paths. The system memory 114 may be embodied as one or more memory devices or data storage locations including, for example, dynamic random access memory devices (DRAM), synchronous dynamic random access memory devices (SDRAM), double-data rate synchronous dynamic random access memory device (DDR SDRAM), flash memory devices, and/or other volatile memory devices. Additionally, although only a single system memory device 114 is illustrated in FIG. 1, in other embodiments, the computing device 102 may include additional system memory devices. In some embodiments, the system memory 114 may be utilized as a shared memory that is accessible to additional processors of the computing device 102.

The computing device 102 may include one or more data storage devices 116. The data storage device(s) 116 may be embodied as any type of devices configured for the short-term or long-term storage of data such as, for example, memory devices and circuits, memory cards, hard disk drives, solid-state drives, or other data storage devices. Each of the data storage device(s) 116 is communicatively coupled to the I/O subsystem 112 via a number of signal paths, allowing the I/O subsystem 112 to receive inputs from and send outputs to the data storage device(s) 116.

The one or more peripheral devices 118 of the computing device 102 may illustratively include a display, a touchpad, a touchscreen, a keyboard, a mouse, a microphone, and/or one or more external speakers, among other peripheral devices. In embodiments in which the computing device 102 includes a display 118, the display 118 may be embodied as, or otherwise include, any type of display device for displaying data to a user of the computing device 102 such as, for example, a liquid crystal display (LCD), a cathode-ray tube (CRT) display, a light emitting diode (LED) display, or other display device. The particular number and type of devices included in the peripheral device(s) 118 of the computing device 102 may depend upon, for example, the intended use of the computing device 102 (e.g., as a desktop computing device or a mobile computing device). Each of the peripheral device(s) 118 is communicatively coupled to the I/O subsystem 112 via a number of signal paths, allowing the I/O subsystem 112 to receive inputs from and send outputs to the peripheral device(s) 118.

The communications circuitry 120 of computing device 102 may be embodied as any number of devices and circuitry for enabling communications between the computing device 102 and the network 108. The communications circuitry 120 may include one or more wired and/or wireless network interfaces to facilitate communications over the wired and/or wireless portions of the network 108. In the illustrative embodiment, the communications circuitry 120 is configured to receive and/or to process one or more verbal communications signals being transmitted between by the computing devices 102, 104, 106. In some embodiments, the communications circuitry 120 may also be configured to receive and/or to process one or more video communications signals being transmitted between by the computing devices 102, 104, 106. The communications circuitry 120 is also communicatively coupled to the I/O subsystem 112 via a number of signal paths.

The computing device 102 also includes a conversation dynamics engine 122. The conversation dynamics engine 122 may be embodied as any number of hardware components, firmware components, and/or software components that analyze verbal and/or video communications signals to generate at least one suggested conversation topic. For instance, in some illustrative embodiments (such as that shown in FIG. 1), the conversation dynamics engine 122 may be embodied as an ancillary processor (e.g., microprocessor, digital signal processor, microcontroller, or the like) of the computing device 102. In such embodiments, the conversation dynamics engine 122 may be communicatively coupled to the I/O subsystem 112 via a number of signal paths, allowing the conversation dynamics engine 122 to receive inputs from and send outputs to other components of the computing device 102 via the I/O subsystem 112. Additionally or alternatively, the conversation dynamics engine 122 may be communicatively coupled directly to other components of the computing device 102 via a number of signal paths, including, but not limited to, the system memory 114 and the communications circuitry 120 (as shown by the hashed lines in FIG. 1). In other illustrative embodiments, the conversation dynamics engine 122 may be embodied as one or more firmware and/or software modules that are executed by the processor 110, the I/O subsystem 112, and/or the communications circuitry 120 of the computing device 102. The operation of the conversation dynamics engine 122 will be further described below with reference to FIGS. 2 and 3.

The computing devices 104, 106 may also be embodied as any type of electronic devices capable of performing the functions described herein, including, but not limited to personal computers, workstations, laptop computers, handheld computers, mobile internet devices, cellular phones, personal data assistants, telephony devices, network appliances, virtualization devices, storage controllers, embedded systems (e.g., in a vehicle), or other computer-based devices. In some embodiments, the computing devices 104, 106 may each include similar components to the computing device 102 described above. In other embodiments, however, the computing devices 104, 106 may each include additional or fewer components. For instance, in one illustrative embodiment of the system 100, one or both of the computing devices 104, 106 may not include a conversation dynamics engine 122 (e.g., the computing device 102 may be the only computing device of the system 100 that includes a conversation dynamics engine 122).

Figure 2:
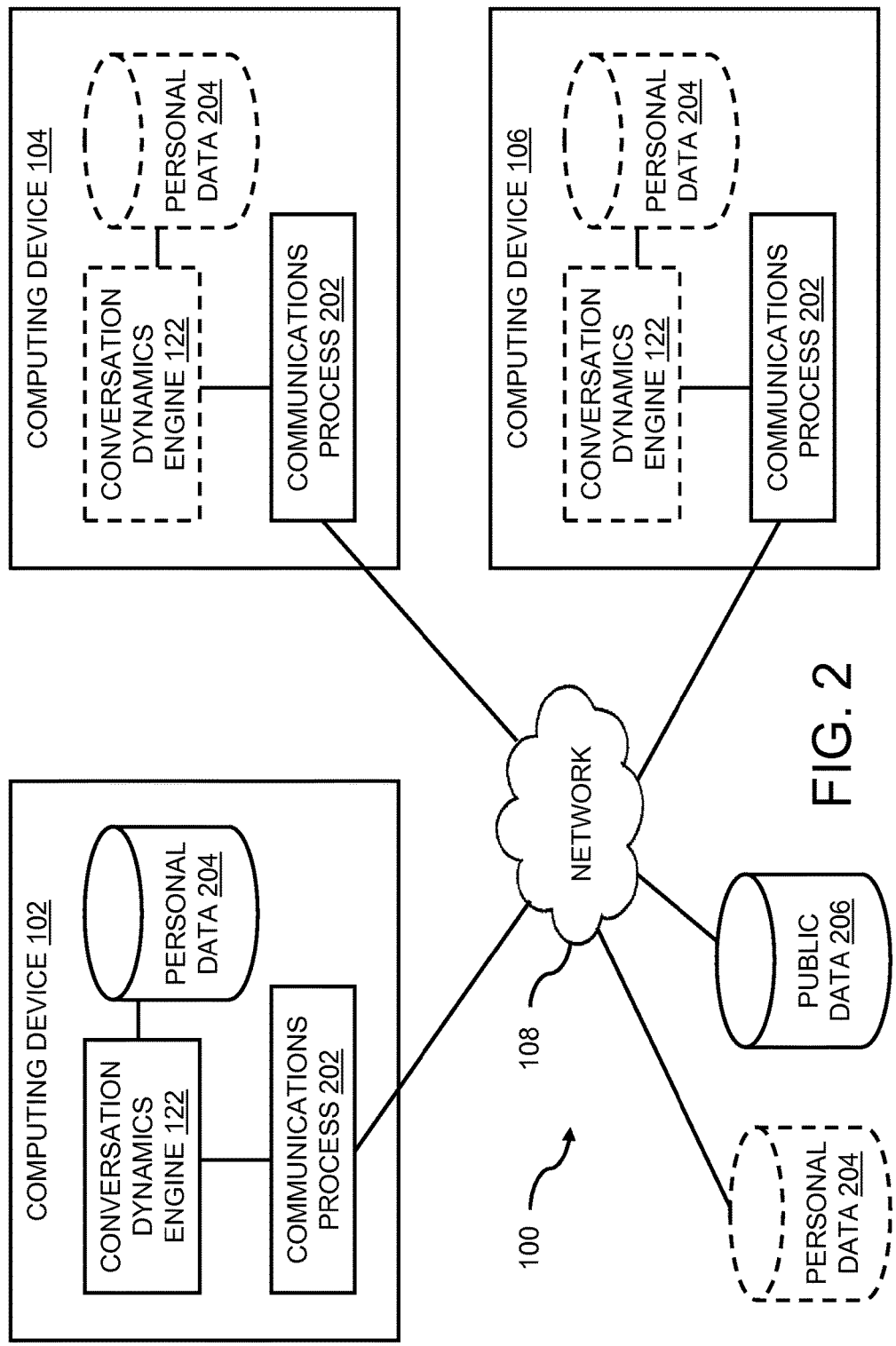
FIG. 2 is a simplified block diagram of at least one embodiment of a communications environment of the system for enriching communications of FIG. 1.

Referring now to FIG. 2, one illustrative embodiment of a communications environment of the system 100 is shown as a simplified block diagram. As discussed above, the system 100 may include any number of computing devices 102, 104, 106 communicatively coupled to one another via a network 108. As described in more detail below, the system 100 may also include one or more personal databases 204 and/or one or more public databases 206 accessible to one or more of the computing devices 102, 104, 106 over the network 108.

During operation of the system 100, verbal and/or video communications signals may be transmitted between some or all of the computing devices 102, 104, 106 via the network 108. To facilitate the transmission of verbal and/or video communications signals between the computing devices 102, 104, 106, each computing device 102, 104, 106 participating in the communications may execute a communications process 202, as illustrated in FIG. 2. In some embodiments, the communications process 202 may be executed by the processor 110 and/or the communications circuitry 120 of each computing device 102, 104, 106 participating in the communications. The communications processes 202 may be embodied as any suitable software or firmware applications, programs, functions, modules, routines, processes, procedures, plug-ins, applets, widgets, code fragments and/or the like, which are capable of transmitting, receiving, and processing verbal and/or video communications signals.

One or more of the computing devices 102, 104, 106 may also include a conversation dynamics engine 122 that interacts with one or more of the communications processes 202. For instance, as illustrated in FIG. 2, the computing device 102 may include a conversation dynamics engine 122 that receives verbal and/or video communications signals from the communications process 202 of the computing device 102. It is contemplated that the computing device 102 including the conversation dynamics engine 122 may be either directly or indirectly involved in the verbal and/or video communications being facilitated by the system 100. By way of illustrative example, a user of the computing device 102 having the conversation dynamics engine 122 may be engaged in verbal and/or video communications with a user of the computing device 104 (which may or may not have its own conversation dynamics engine 122). As another illustrative example, a user of the computing device 104 may be engaged in verbal and/or video communications with a user of the computing device 106, and the computing device 102 having the conversation dynamics engine 122 may be functioning as a server that monitors and analyzes the verbal and/or video communication signals transmitted between the computing devices 104, 106 (i.e., the computing device 102 may not have a user that is participating in the verbal and/or video communications). In summary, the system 100 may include any number of computing devices 102, 104, 106; all or any subset of the computing devices 102, 104, 106 may have users engaged in verbal and/or video communications using the system 100; and all or any subset of the computing devices 102, 104, 106 may include a conversation dynamics engine 122 that analyzes the verbal and/or video communications signals to generate at least one suggested conversation topic (to be displayed to one or more of the users).

The system 100 includes one or more personal databases 204, which may each be embodied as data stored in any suitable data structure and location, including, but not limited to, a relational database, a flat file database, or data stored in the system memory 114 and/or the one or more data storage devices 116 of one of the computing devices 102, 104, 106. In some embodiments, each computing device 102, 104, 106 may include a personal database 204 that is accessible only to the conversation dynamics engine 122 of the same computing device 102, 104, 106. In other embodiments, the personal database 204 may be accessible to the conversation dynamics engines 122 of other authorized computing devices 102, 104, 106 via the network 108. Additionally or alternatively, the system 100 may include one or more personal databases 204 stored in other locations (besides the computing devices 102, 104, 106) that are accessible to the conversation dynamics engines 122 of authorized computing devices 102, 104, 106 via the network 108. It is also contemplated that the one or more personal databases 204 may be accessible to other components (besides the conversation dynamics engines 122) of authorized computing devices 102, 104, 106. In any case, access to the one or more personal databases 204 is restricted to authorized users/devices/components.

The one or more personal databases 204 may be accessed by the one or more conversation dynamics engines 122 when analyzing verbal and/or video communications signals to generate at least one suggested conversation topic and when performing other functions (e.g., retrieving a media element corresponding to a suggested conversation topic). As such, the one or more personal databases 204 may store personal data relating to a particular user and/or group of users. For instance, a personal database 204 may store biographical information, geographical information, previous conversation topics, user preferences, and the like. The one or more personal databases 204 may also store media elements belonging to a particular user and/or group of users. For instance, a personal database 204 may store pictures, videos, audio, literature, and the like. As will be described in more detail below, a conversation dynamics engine 122 with access to a personal database 204 may utilize any personal data and/or media elements stored in the personal database 204 when performing its functions.

The system 100 may also include one or more public databases 206, which may each be embodied as data stored in any suitable data structure and location. In some embodiments, the one or more public databases 206 may allow unrestricted access by any user/device on the network 108. It is also contemplated that a public database 206 may allow "unrestricted" access by some subset of all users/devices on the network 108 (e.g., all subscribers, all purchasers of a product/service, all members of an organization, etc.). The one or more public databases 206 may also be accessed by the one or more conversation dynamics engines 122 when analyzing verbal and/or video communications signals to generate at least one suggested conversation topic and when performing other functions (e.g., retrieving an element corresponding to a suggested conversation topic). As such, the one or more public databases 206 may store public data and/or media elements, including, but not limited to, news, weather, historical information, pictures, videos, audio, literature, and the like. As will be described in more detail below, a conversation dynamics engine 122 with access to a public database 206 may utilize any public data and/or media elements stored in the public database 206 when performing its functions.

Figure 3:
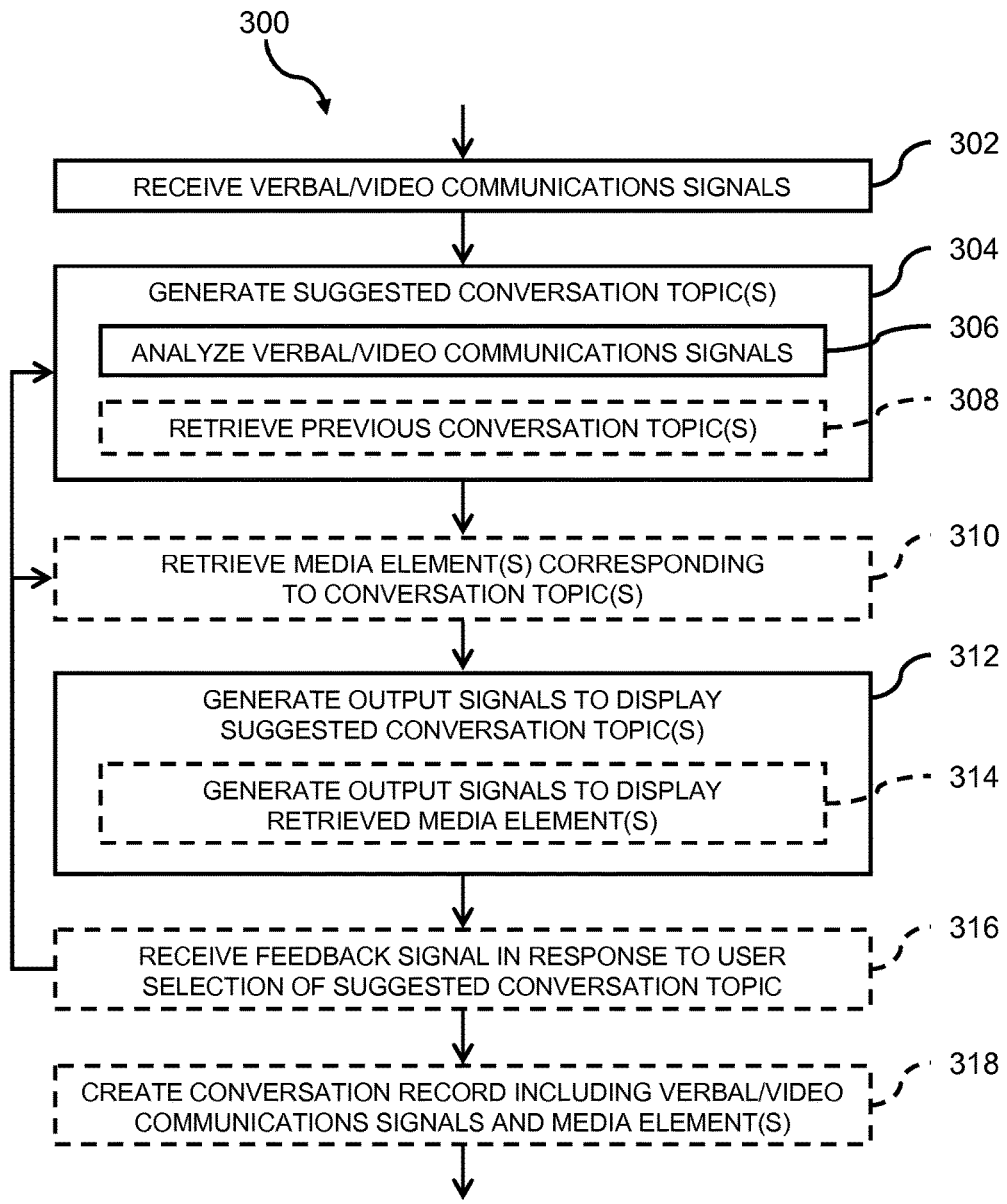
FIG. 3 is a simplified flow diagram of at least one embodiment of a method for enriching communications that may be executed by the at least one computing device of FIG. 1 having the conversation dynamics engine.

Referring now to FIG. 3, one illustrative embodiment of a method 300 for enriching communications is shown as a simplified flow diagram. In the illustrative embodiment, the method 300 may be executed by the conversation dynamics engine 122 of the computing device 102, in conjunction with one or more other components of the computing device 102 (e.g., communications circuitry 120) and of the system 100 (e.g., personal database 204, public database 206). It is also contemplated that, in other embodiments, the method 300 may be performed cooperatively by a plurality of conversation dynamics engines 122 on a plurality of computing devices 102, 104, 106. The method 300 is illustrated as a number of blocks 302-318 in FIG. 3. Blocks 308, 310, 314, 316, 318 may be optionally employed in some embodiments of the method 300 and are, therefore, indicated in phantom in FIG. 3.

The method 300 begins with block 302 in which the conversation dynamics engine 122 receives verbal and/or video communications signals being transmitting between two or more of the computing devices 102, 104, 106. As discussed above, in some embodiments, these signals may carry verbal and/or video communications between users of the computing device 102 and of one or more of the computing devices 104, 106. In other embodiments (where the computing device 102 functions as a server), these signals may carry verbal and/or video communications between users of the computing devices 104, 106. The verbal and/or video communications signals may be received and/or processed by the communications circuitry 120 of the computing device 102 and passed to the conversation dynamics engine 122 by the communications process 202 running on the computing device 102. The signals received by the conversation dynamics engine 122 include at least verbal communications signals. In some embodiments, the signals received by the conversation dynamics engine 122 may additionally include video communications signals.

After block 302, the method 300 proceeds to block 304 in which the conversation dynamics engine 122 generates at least one suggested conversation topic. During block 304, the conversation dynamics engine 122 evaluates various inputs to assess and grade possibly relevant conversation topics. As a result, the conversation dynamics engine 122 arrives at one or more suggested conversation topics that may be presented to a user, or users, of the system 100. In some embodiments of block 304, the conversation dynamics engine 122 may generate a plurality of suggested conversation topics. The conversation dynamics engine 122 may consider any number of suitable inputs when generating the suggested conversation topic(s). For instance, the conversation dynamics engine 122 may analyze the received verbal and/or video communications signals (as further discussed below with reference to block 306). In some embodiments, the conversation dynamics engine 122 may also retrieve information from a personal database 204 and/or a public database 206 (e.g., a previous conversation topic, as discussed below with reference to block 308). For instance, during block 304, the conversation dynamics engine 122 may match keywords determined from analyzed verbal communications signals with terms found in a personal database 204 and/or a public database 206. In some embodiments, the conversation dynamics engine 122 may also consider user feedback (e.g., a user selection of a suggested conversation topic or a displayed media element, as discussed below with reference to block 316).

In the illustrative embodiment of method 300, block 304 involves block 306 in which the conversation dynamics engine 122 analyzes verbal and/or video communications signals received during block 302. In some embodiments, the verbal and/or video communications signals may be analyzed in real-time (i.e., as the signals are being transmitted between two or more of the computing devices 102, 104, 106). The conversation dynamics engine 122 may analyze the verbal and/or video communications signals in block 306 using any suitable technique. For instance, in some embodiments, the conversation dynamics engine 122 may analyze the verbal communications signals by assessing a voice characteristic of a user of at least one of the computing devices 102, 104, 106. It is contemplated that the conversation dynamics engine 122 may analyze voice characteristics such as a user's voice tone, time between responses, volume, and the like. In other embodiments, the conversation dynamics engine 122 may analyze the verbal communications signals by recognizing one or more keywords spoken by a user of at least one of the computing devices 102, 104, 106. In embodiments where video communications signals are received in block 302, the conversation dynamics engine 122 may analyze the video communications signals by assessing one or more facial expressions and/or body gestures of a user of at least one of the computing devices 102, 104, 106. It is contemplated that the conversation dynamics engine 122 may assess body gestures such as a user's head, arm, and hand movements, as well as a user's body positioning and/or posture.

In some embodiments of the method 300, the block 304 may optionally include block 308 in which the conversation dynamics engine 122 retrieves one or more previous conversation topics from a personal database 204. For instance, during block 308, the conversation dynamics engine 122 may retrieve a relevant conversation topic from previous verbal and/or video communications involving one or more users engaged in the current verbal and/or video communications. The conversation dynamics engine 122 may then consider the one or more previous conversation topics retrieved from the personal database 204 when generating at least one suggested conversation topic for the current verbal and/or video communications in block 304.

After block 304, the method 300 may optionally proceed to block 310 in which the conversation dynamics engine 122 retrieves one or more media elements corresponding to the suggested conversation topic(s) generated in block 304. In the illustrative embodiment, these contextually relevant media elements may include pictures, videos, audio, literature, and the like. For instance, where the suggested conversation topic generated in block 304 is a user's recent vacation, the conversation dynamics engine 122 may retrieve a picture taken by the user during the vacation or a news article regarding the destination visited by the user. In some embodiments, the conversation dynamics engine 122 may retrieve the one or more media elements from one or more personal databases 204 and/or one or more public databases 206.

After block 310 (or after block 304, in embodiments not employing block 310), the method 300 proceeds to block 312 in which the conversation dynamics engine 122 generates one or more output signals that cause the suggested conversation topic(s) generated in block 304 to be presented to a user of at least one of the computing devices 102, 104, 106. In embodiments of the method 300 employing block 310, block 312 may also involve block 314 in which the conversation dynamics engine 122 generates one or more output signals that cause the media element(s) retrieved in block 310 to be presented to a user of at least one of the computing devices 102, 104, 106. For instance, the output signals generated by the conversation dynamics engine 122 in block 312 may cause the suggested conversation topic(s) and/or the media element(s) to be presented on a display 118 of at least one of the computing devices 102, 104, 106. In some embodiments, the output signals generated by the conversation dynamics engine 122 in block 312 may cause the suggested conversation topic(s) and/or the media element(s) to be presented on the displays 118 of a plurality of the computing devices 102, 104, 106 of the system 100. In embodiments where block 304 involves generating a plurality of suggested conversation topics, the plurality of suggested conversation topics may be displayed as a list or menu during block 312.

After block 312, the method 300 may optionally proceed to block 316 in which the conversation dynamics engine 122 receives a feedback signal in response to a user selection of a suggested conversation topic (or a media element) displayed during block 312. In some embodiments, one or more of the computing devices 102, 104, 106 may allow a user to select a suggested conversation topic (or a media element). For instance, the user might touch a suggested conversation topic on a touchscreen 118 of one of the computing devices 102, 104, 106. In response to this user input, the relevant computing device 102, 104, 106 may send a feedback signal to the conversation dynamics engine 122 indicating the selected conversation topic. In response to receiving a feedback signal in block 316, the conversation dynamics engine 122 may perform a number of actions. In some embodiments, the method 300 may return to block 304 in which the conversation dynamics engine 122 may generate at least one additional suggested conversation topic in response to the feedback signal received in block 316. In other embodiments, the method 300 may return to block 310 in which the conversation dynamics engine 122 may retrieve one or more media elements in response to the feedback signal received in block 316. The retrieved media element(s) may correspond to the user selection represented by the feedback signal.

It will be appreciated that any or all of the blocks 302-316 of the method 300 may be performed continuously or intermittently throughout the duration of verbal and/or video communications between users of the system 100. For instance, verbal and/or video communications signals may be continuously received in block 302 as the signals are transmitted between two or more of the computing devices 102, 104, 106. In some embodiments, the conversation dynamics engine 122 may continuously or intermittently refine the suggested conversation topic(s) generated in block 304 and cause the refined suggested conversation topic(s) to be displayed in block 310.

After the conclusion of verbal and/or video communications between users of the system 100, the method 300 may optionally proceed to block 318 in which the conversation dynamics engine 122 creates a conversation montage of the verbal and/or video communications. In some embodiments, the conversation montage created in block 318 may include verbal communications signals received in block 302, video communications signals received in block 302, suggested conversation topics generated in block 304, and/or one or more media elements retrieved in block 310. It is also contemplated that the conversation montage may include images, video clips, audio clips, and/or other media elements and may be arranged in any audiovisual, visual, or audio format. For example, the montage may be arranged as a timeline, mosaic, tiled thumbnail images, or a combination of multiple formats. In the illustrative embodiment, the conversation montage may be embodied as an audiovisual montage created by the conversation dynamics engine 122. In some embodiments of block 318, the conversation dynamics engine 122 may store the conversation montage on the personal database 204 for later retrieval or viewing by a user.

EXAMPLES

Illustrative examples of the devices, systems, and methods disclosed herein are provided below. An embodiment of the devices, systems, and methods may include any one or more, and any combination of, the examples described below.

In one example, a computing device for enriching communications may comprise communications circuitry to process one or more verbal communications signals being transmitted between the computing device and a remote computing device, the one or more verbal communications signals relating to a conversation between a user of the computing device and a user of the remote computing device, a conversation dynamics engine to generate at least one suggested conversation topic by analyzing the one or more verbal communications signals, and a display to present the at least one suggested conversation topic to the user of the computing device. In an example, the conversation dynamics engine may further be to retrieve a media element corresponding to the at least one suggested conversation topic and the display may further be to present the media element to the user of the computing device.

Additionally, in an example, the media element may be at least one of a picture, a video, audio, and literature stored in a personal database having restricted access. In an example, the personal database may be stored on the computing device. In an example, the media element may be at least one of a picture, a video, audio, and literature stored in a public database having unrestricted access. In another example, the conversation dynamics engine may further be to create a conversation montage comprising the one or more verbal communications signals, the at least one suggested conversation topic, and the media element.

In an example, the conversation dynamics engine may be to generate a plurality of suggested conversation topics by analyzing the one or more verbal communications signals, and the display may be to present the plurality of suggested conversation topics to the user of the computing device. In an example, the conversation dynamics engine may further be to receive a feedback signal in response to a user selection of one of the plurality of suggested conversation topics. In an example, the conversation dynamics engine may further be to generate at least one additional suggested conversation topic with the conversation dynamics engine in response to the feedback signal.

In an example, the conversation dynamics engine may further be to retrieve a media element in response to the feedback signal, the media element corresponding to the user selection of one of the plurality of suggested conversation topics, and the display may further be to present the media element to the user of the computing device. In an example, the media element may be at least one of a picture, a video, audio, and literature stored in a personal database having restricted access. In another example, the media element may be at least one of a picture, a video, audio, and literature stored in a public database having unrestricted access. In an example, the conversation dynamics engine may further be to create a conversation montage comprising the one or more verbal communications signals, the selected one of the plurality of suggested conversation topics, and the media element.

In an example, the conversation dynamics engine may be to analyze the one or more verbal communications signals, at least in part, by assessing a voice characteristic of at least one of the user of the computing device and the user of the remote computing device. In another example, the conversation dynamics engine may be to analyze the one or more verbal communications signals, at least in part, by recognizing one or more keywords spoken by at least one of the user of the computing device and the user of the remote computing device.

In another example, the communications circuitry may further be to process one or more video communications signals being transmitted between the computing device and the remote computing device, the one or more video communications signals relating to the conversation between the user of the computing device and a the user of the remote computing device, and the conversation dynamics engine may further be to generate the at least one suggested conversation topic by analyzing the one or more video communications signals, along with the one or more verbal communications signals. In an example, the conversation dynamics engine may be to analyze the one or more video communications signals, at least in part, by assessing a facial expression of at least one of the user of the computing device and the user of the remote computing device. In an example, the conversation dynamics engine may be to analyze the one or more video communications signals, at least in part, by assessing one or more body gestures used by at least one of the user of the computing device and the user of the remote computing device. In an example, the conversation dynamics engine may further be to retrieve at least one previous conversation topic from a personal database having restricted access and to generate the at least one suggested conversation topic by analyzing the at least one previous conversation topic, along with the one or more verbal communications signals.

In an example, a method for enriching communications may comprise receiving one or more verbal communications signals being transmitted between a first computing device and a second computing device, the one or more verbal communications signals relating to a conversation between the user of the first computing device and the user of the second computing device, analyzing the one or more verbal communications signals using a conversation dynamics engine to generate at least one suggested conversation topic, and generating one or more output signals that cause the at least one suggested conversation topic to be displayed on the first computing device. In an example, the one or more output signals may also cause the at least one suggested conversation topic to be displayed on the second computing device.

In another example, the method may further comprise retrieving a media element corresponding to the at least one suggested conversation topic and generating one or more output signals that cause the media element to be displayed on the first computing device. In an example, the one or more output signals may also cause the media element to be displayed on the second computing device. In an example, retrieving the media element may comprise retrieving at least one of a picture, a video, audio, and literature from a personal database having restricted access. In another example, retrieving the media element may comprise retrieving at least one of a picture, a video, audio, and literature from a public database having unrestricted access. In an example, the method may further comprise creating a conversation montage comprising the one or more verbal communications signals, the at least one suggested conversation topic, and the media element.

In an example, the conversation dynamics engine may analyze the one or more verbal communications signals to generate a plurality of suggested conversation topics, and the one or more output signals may cause the plurality of suggested conversation topics to be displayed on the first computing device. In an example, the one or more output signals may also cause the plurality of suggested conversation topics to be displayed on the second computing device.

In an example, the method may further comprise receiving a feedback signal in response to a user selection of one of the plurality of suggested conversation topics. In another example, the method may further comprise generating at least one additional suggested conversation topic with the conversation dynamics engine in response to the feedback signal.

In another example, the method may further comprise retrieving a media element in response to the feedback signal, the media element corresponding to the user selection of one of the plurality of suggested conversation topics and generating one or more output signals that cause the media element to be displayed on the first computing device. In an example, the one or more output signals may also cause the media element to be displayed on the second computing device. In an example, retrieving the media element may comprise retrieving at least one of a picture, a video, audio, and literature from a personal database having restricted access. In another example, retrieving the media element may comprise retrieving at least one of a picture, a video, audio, and literature from a public database having unrestricted access. In an example, the method may further comprise creating a conversation montage comprising the one or more verbal communications signals, the selected one of the plurality of suggested conversation topics, and the media element.

In an example, analyzing the one or more verbal communications signals using the conversation dynamics engine may comprise assessing at least one a voice characteristic of at least one of the user of the first computing device and the user of the second computing device. In another example, analyzing the one or more verbal communications signals using the conversation dynamics engine may comprise recognizing one or more keywords spoken by at least one of the user of the first computing device and the user of the second computing device.

In another example, the method may further comprise receiving one or more video communications signals being transmitted between the first computing device and the second computing device, the one or more video communications signals relating to the conversation between the user of the first computing device and the user of the second computing device, and analyzing the one or more video communications signals, along with the one or more verbal communications signals, using the conversation dynamics engine to generate the at least one suggested conversation topic. In an example, analyzing the one or more video communications signals using the conversation dynamics engine may comprise assessing a facial expression of at least one of the user of the first computing device and the user of the second computing device. In another example, analyzing the one or more video communications signals using the conversation dynamics engine may comprise assessing one or more body gestures used by at least one of the user of the first computing device and the user of the second computing device. In an example, the method may further comprise retrieving at least one previous conversation topic from a personal database having restricted access and analyzing the at least one previous conversation topic, along with the one or more verbal communications signals, using the conversation dynamics engine to generate the at least one suggested conversation topic.

In an example, the first computing device may comprise the conversation dynamics engine, the first computing device being communicatively coupled to the second computing device via a communications network. In another example, a third computing device may comprise the conversation dynamics engine, the third computing device being communicatively coupled to the first and second computing devices via a communications network.

In an example, a computing device for enriching communications may comprise a processor and a memory having stored therein a plurality of instructions that, when executed by the processor, cause the computing device to perform any one of the exemplary methods disclosed above. In another example, one or more machine readable storage media may comprise a plurality of instructions stored thereon that, in response to being executed, result in a computing device performing any one of the exemplary methods disclosed above.

While the concepts of the present disclosure have been illustrated and described in detail in the drawings and foregoing description, such an illustration and description is to be considered as exemplary and not restrictive in character, it being understood that only illustrative embodiments have been shown and described and that all changes and modifications consistent with the disclosure and recited claims are desired to be protected.

The invention claimed is:

1. A computing device for enriching communications, the computing device comprising:
communications circuitry to process one or more verbal communications signals transmitted between the computing device and a remote computing device, wherein the one or more verbal communications signals relate to a current conversation between a user of the computing device and a user of the remote computing device, wherein the current conversation has a current topic;
a conversation dynamics hardware engine to (i) analyze the one or more verbal communication signals to identify one or more keywords of the current conversation, (ii) access data from a personal database based on the identified keywords of the current conversation, (iii) generate a plurality of new conversation topics different from the current topic based on the identified keywords of the current conversation and the data from the personal database, (iv) grade each of the plurality of new conversation topics based on the identified keywords of the current conversation and the data from the personal database to determine a relevancy for each corresponding new conversation topic, and (v) identify at least one relevant conversation topic from the plurality of new conversation topics based on the relevancy of each of the plurality of new conversation topics; and a display to present the at least one relevant conversation topic to the user of the computing device.

2. The computing device of claim 1, wherein the conversation dynamics hardware engine is further to receive a feedback signal in response to a user selection of one of the relevant conversation topics.

3. The computing device of claim 2, wherein the conversation dynamics hardware engine is further to generate at least one additional relevant conversation topic with the conversation dynamics hardware engine in response to the feedback signal.

4. The computing device of claim 2, wherein:
the conversation dynamics hardware engine is further to retrieve a media element in response to the feedback signal, the media element corresponding to the user selection of one of the one or more relevant conversation topics; and
the display is further to present the media element to the user of the computing device.

5. The computing device of claim 1, wherein the conversation dynamics hardware engine is to analyze the one or more verbal communications signals, at least in part, by assessing a voice characteristic of at least one of the user of the computing device and the user of the remote computing device.

6. The computing device of claim 1, wherein:
the communications circuitry is further configured to process one or more video communications signals being transmitted between the computing device and the remote computing device, the one or more video communications signals relating to the conversation between the user of the computing device and the user of the remote computing device; and
the conversation dynamics hardware engine is further to generate the at least one relevant conversation topic by analyzing the one or more video communications signals, along with the one or more verbal communications signals.

7. The computing device of claim 6, wherein the conversation dynamics hardware engine is to analyze the one or more video communications signals, at least in part, by assessing a facial expression of at least one of the user of the computing device and the user of the remote computing device.

8. The computing device of claim 6, wherein the conversation dynamics hardware engine is to analyze the one or more video communications signals, at least in part, by assessing one or more body gestures used by at least one of the user of the computing device and the user of the remote computing device.

9. The computing device of claim 1, wherein the conversation dynamics hardware engine is further to analyze a time between responses in the one or more verbal communication signals, and wherein to generate a plurality of new conversation topics comprises to generate a plurality of new conversation topics further based on the time between responses.

10. The computing device of claim 1, wherein the data comprises biographical information, and wherein to generate a plurality of new conversation topics comprises to generate a plurality of new conversation topics further based on the biographical information.

11. The computing device of claim 1, wherein the data comprises geographical information, and wherein to generate a plurality of new conversation topics comprises to generate a plurality of new conversation topics further based on the geographical information.

12. The computing device of claim 1, wherein the data comprises previous conversation topics, and wherein to generate a plurality of new conversation topics comprises to generate a plurality of new conversation topics further based on the previous conversation topics.

13. The computing device of claim 1, wherein the data comprises user preferences, and wherein to generate a plurality of new conversation topics comprises to generate a plurality of new conversation topics further based on the user preferences.

14. The computing device of claim 1, wherein the data comprises media elements associated with the user of the computing device, and wherein to generate a plurality of new conversation topics comprises to generate a plurality of new conversation topics further based on the media elements associated with the user of the computing device.

15. A method for enriching communications, the method comprising:
receiving one or more verbal communications signals being transmitted between a first computing device and a second computing device, the one or more verbal communications signals relating to a current conversation between a user of the first computing device and a user of the second computing device, wherein the current conversation has a current topic;
analyzing the one or more verbal communications signals using a conversation dynamics hardware engine to identify one or more keywords of the current conversation;
access data from a personal database based on the identified keywords of the current conversation;
generating a plurality of new conversation topics different from the current topic based on the identified keywords of the current conversation and the data from the personal database;
grading each of the plurality of new conversation topics based on the identified keywords of the current conversation and the data from the personal database to determine a relevancy for each corresponding new conversation topic;
identifying at least one relevant conversation topic from the plurality of new conversation topics based on the relevancy of each of the plurality of new conversation topics; and
generating one or more output signals that cause the at least one relevant conversation topic to be displayed on the first computing device.

16. The method of claim 15, further comprising receiving a feedback signal in response to a user selection of one of the relevant conversation topics.

17. The method of claim 16, further comprising generating at least one additional relevant conversation topic with the conversation dynamics hardware engine in response to the feedback signal.

18. The method of claim 16, further comprising:
retrieving a media element in response to the feedback signal, the media element corresponding to the user selection of one of the relevant conversation topics; and generating one or more output signals that cause the media element to be displayed on the first computing device.

19. The method of claim 15, wherein analyzing the one or more verbal communications signals using the conversation dynamics hardware engine comprises assessing at least one of a voice characteristic of at least one of the user of the first computing device and the user of the second computing device.

20. The method of claim 15, further comprising:
receiving one or more video communications signals being transmitted between the first computing device and the second computing device, the one or more video communications signals relating to the conversation between the user of the first computing device and the user of the second computing device; and
analyzing the one or more video communications signals, along with the one or more verbal communications signals, using the conversation dynamics hardware engine to generate the at least one relevant conversation topic.

21. The method of claim 20, wherein analyzing the one or more video communications signals using the conversation dynamics hardware engine comprises assessing a facial expression of at least one of the user of the first computing device and the user of the second computing device.

22. The method of claim 20, wherein analyzing the one or more video communications signals using the conversation dynamics hardware engine comprises assessing one or more body gestures used by at least one of the user of the first computing device and the user of the second computing device.

23. One or more non-transitory, machine readable storage media comprising a plurality of instructions stored thereon that, in response to being executed, result in a first computing device:
receiving one or more verbal communications signals being transmitted between the first computing device and a second computing device, the one or more verbal communications signals relating to a current conversation between a user of the first computing device and a user of the second computing device, wherein the current conversation has a current topic;
analyzing the one or more verbal communications signals using a conversation dynamics hardware engine to identify one or more keywords of the current conversation;
accessing data from a personal database based on the identified keywords of the current conversation;
generating a plurality of new conversation topics different from the current topic based on the identified keywords of the current conversation and the data from the personal database;
determining a relevancy for each of the plurality of new conversation topics based on the identified keywords of the current conversation and the data from the personal database by grading each of the plurality of new conversation topics;
identifying at least one relevant conversation topic from the plurality of new conversation topics based on the relevancy of each of the plurality of new conversation topics; and
generating one or more output signals that cause the at least one relevant conversation topic to be displayed on the first computing device.

24. The one or more non-transitory, machine readable storage media of claim 23, wherein the plurality of instructions further result in the first computing device receiving a feedback signal in response to a user selection of one of the relevant conversation topics.

25. The one or more non-transitory, machine readable storage media of claim 24, wherein the plurality of instructions further result in the first computing device generating at least one additional relevant conversation topic with the conversation dynamics hardware engine in response to the feedback signal.

26. The one or more non-transitory, machine readable storage media of claim 24, wherein the plurality of instructions further result in the first computing device:
retrieving a media element in response to the feedback signal, the media element corresponding to the user selection of one of the relevant conversation topics; and
generating one or more output signals that cause the media element to be displayed on the first computing device.

27. The one or more non-transitory, machine readable storage media of claim 23, wherein analyzing the one or more verbal communications signals using the conversation dynamics hardware engine comprises assessing at least one of a voice characteristic of at least one of the user of the first computing device and the user of the second computing device.

28. The one or more non-transitory, machine readable storage media of claim 23, wherein the plurality of instructions further result in the first computing device:
receiving one or more video communications signals being transmitted between the first computing device and the second computing device, the one or more video communications signals relating to the conversation between the user of the first computing device and the user of the second computing device; and
analyzing the one or more video communications signals, along with the one or more verbal communications signals, using the conversation dynamics hardware engine to generate the at least one relevant conversation topic.

29. The one or more non-transitory, machine readable storage media of claim 28, wherein analyzing the one or more video communications signals using the conversation dynamics hardware engine comprises assessing a facial expression of at least one of the user of the first computing device and the user of the second computing device.

30. The one or more non-transitory, machine readable storage media of claim 28, wherein analyzing the one or more video communications signals using the conversation dynamics engine hardware comprises assessing one or more body gestures used by at least one of the user of the first computing device and the user of the second computing device.

* * * * *